March 19, 1968  V. A. LOMBARDO ET AL  3,373,476
CARTON HANDLE ASSEMBLING MACHINE
Filed Oct. 7, 1965  4 Sheets-Sheet 1
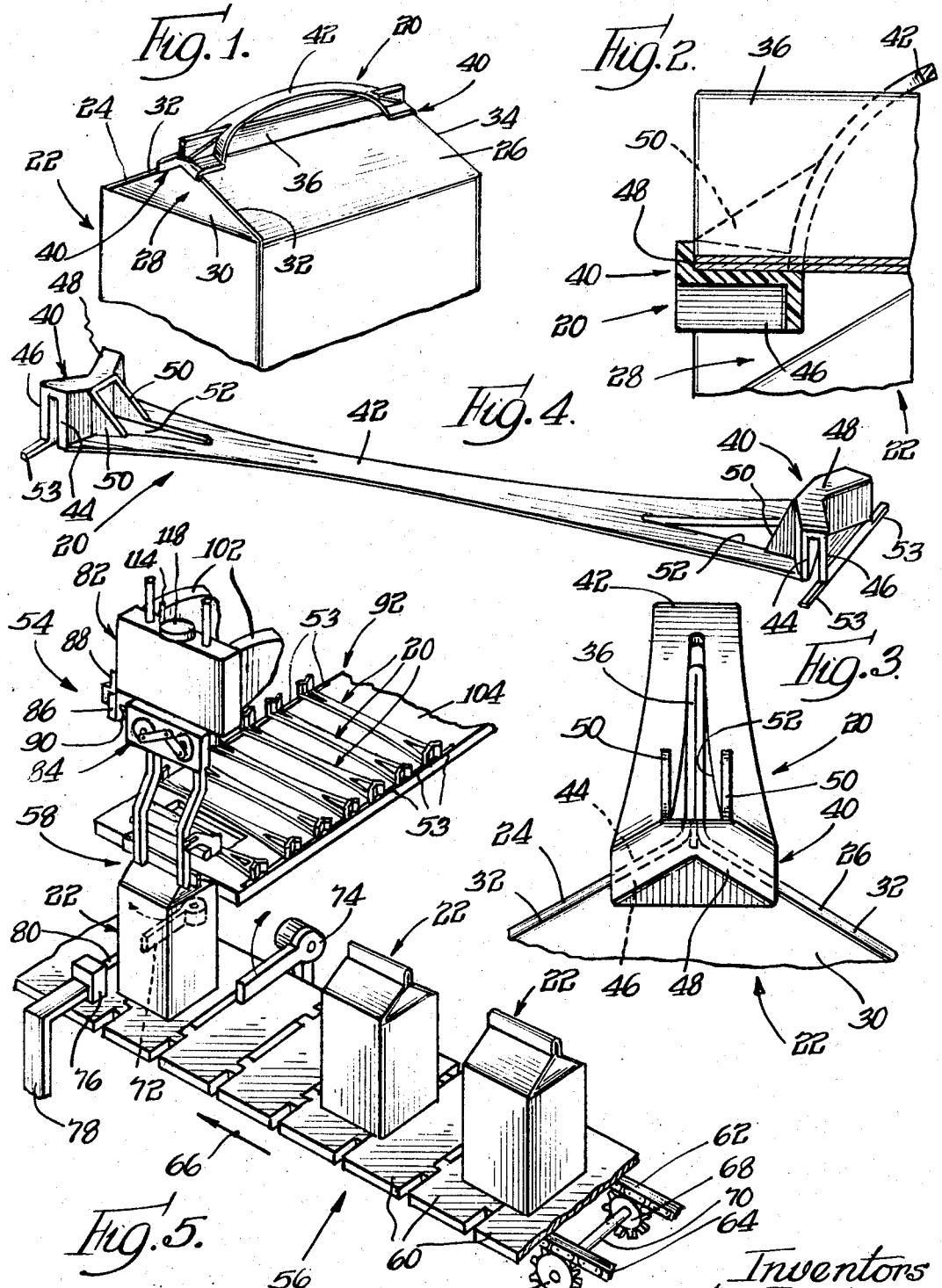

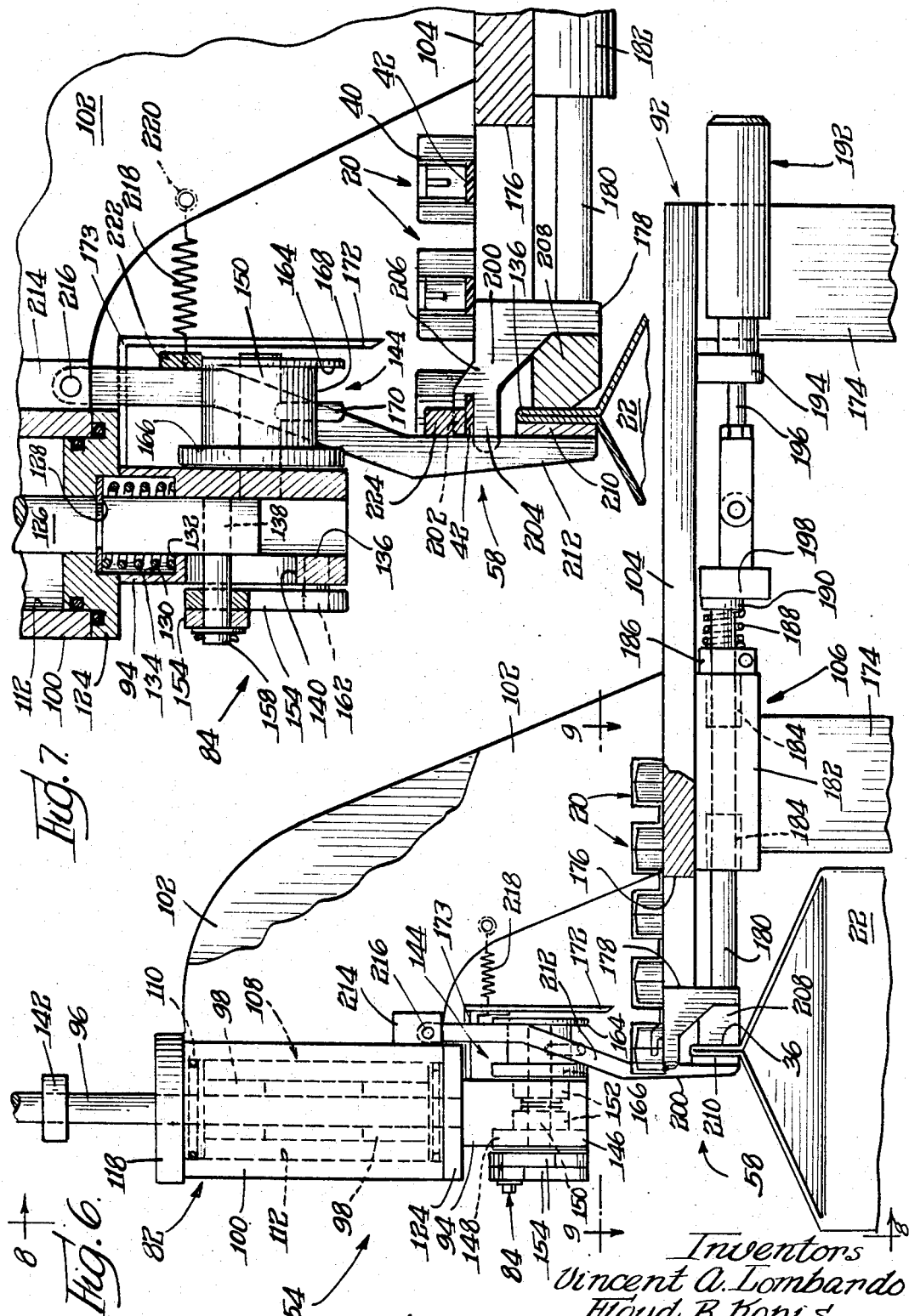

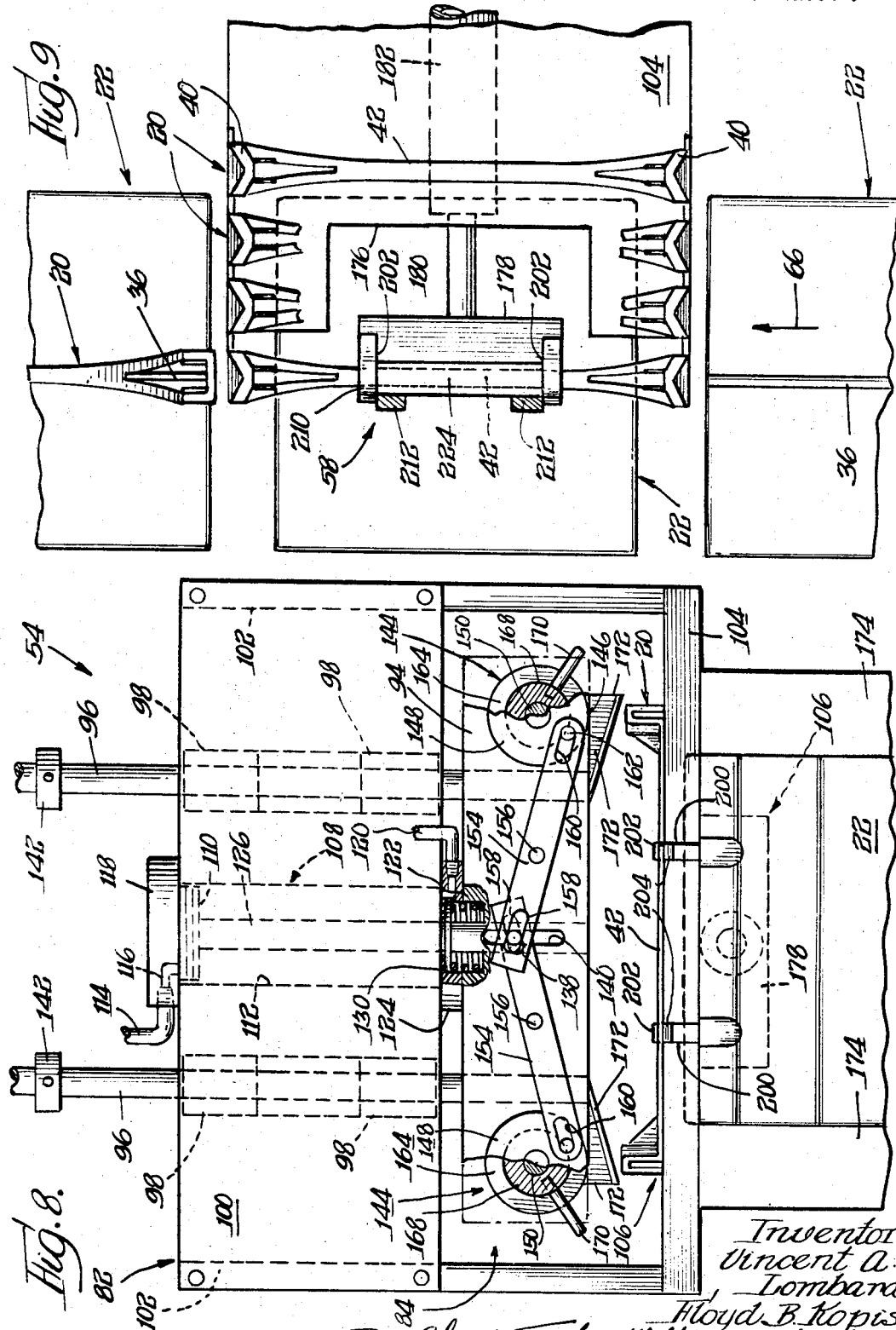

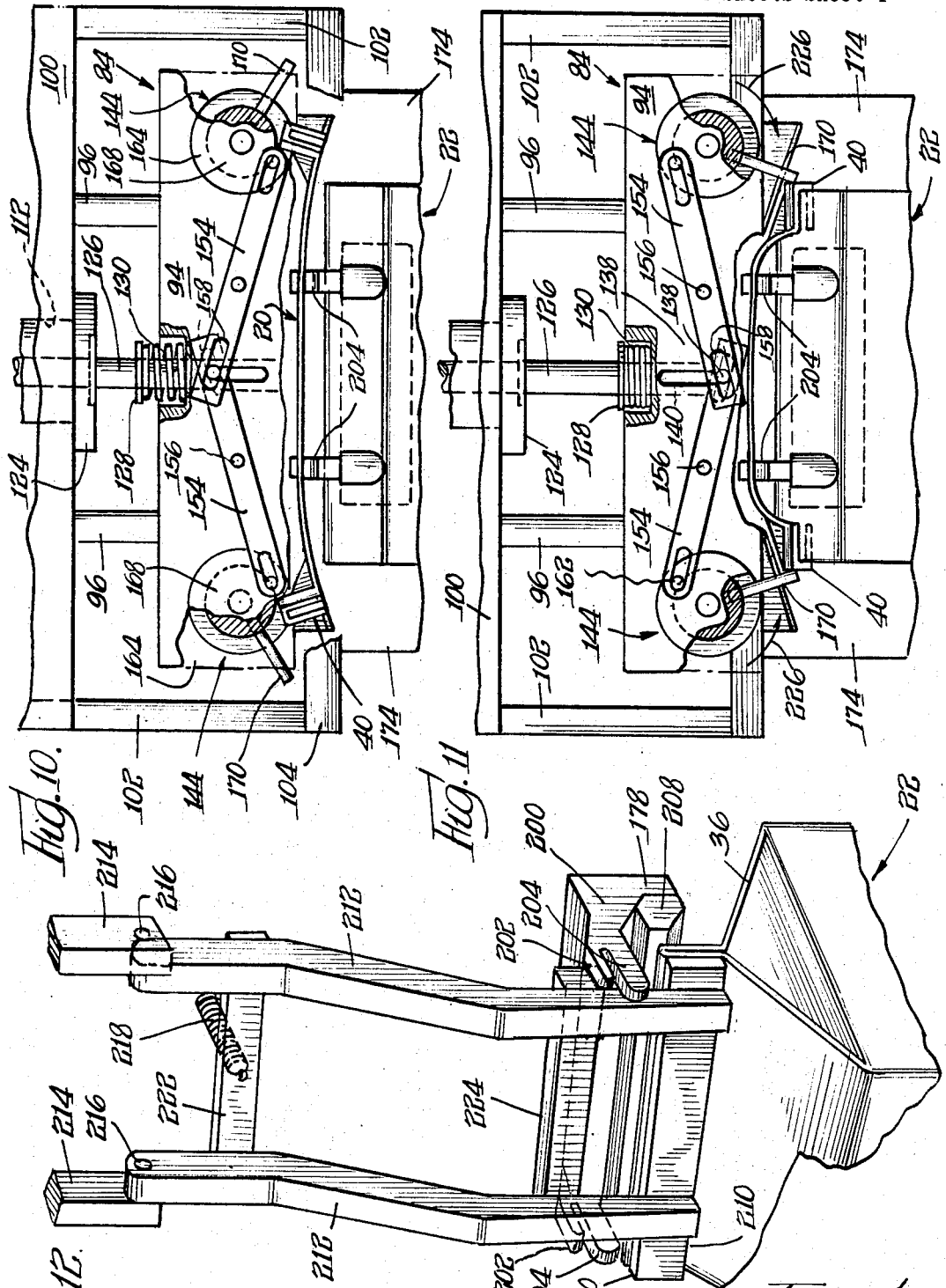

United States Patent Office 3,373,476
Patented Mar. 19, 1968

3,373,476
CARTON HANDLE ASSEMBLING MACHINE
Vincent A. Lombardo and Floyd B. Kopis, Addison, Ill.,
assignors to Walter E. Hidding, Arlington Heights, Ill.
Filed Oct. 7, 1965, Ser. No. 493,817
9 Claims. (Cl. 29—208)

ABSTRACT OF THE DISCLOSURE

Apparatus for assembling to a carton a handle of the type having spaced fitments joined by a flexible strap wherein handle feeding means includes pawl means operative to convey a said handle along a path toward a work station and wherein fitment mounting means includes spaced opposed walls aligned with the pawl means at the work station for directing movement of the fitments toward an assembled position with the carton, the fitment mounting means further including positioning means operable to contact handles disposed at the work station by the pawl means and to cause forcibly guided movement of the handle between the spaced opposed walls.

---

This invention relates generally to machines for affixing carton carriers and more particularly to apparatus for assembling individual carrier handles to gabled cartons.

Gabled cartons have many advantages as containers for such fluid products and fresh whole milk, but consumers have found this type of carton to be somewhat inconvenient to grasp and manipulate, especially in sizes of one-gallon or more. Carrier handles which solve the aforesaid problem have been disclosed by Walter E. Hidding in application Ser. No. 429,535, filed Feb. 1, 1965, issued Jan. 10, 1967, as United States Letters Patent No. 3,297,350; and an important object of the present invention is to provide apparatus for automatically assembling carrier handles of that general type to gabled cartons.

A more general object of the invention is to provide new and improved apparatus for assembling carrier handles to cartons.

Another object of the invention is to provide a machine that is capable of assembling carrier handles to gabled cartons in a rapid and positive manner.

Still another object of the invention is to provide a carton handle assembling machine that is susceptible to easy incorporation with carton filling and sealing equipment.

These and other objects and features of the invention will become more apparent from a consideration of the following descriptions.

Handles of the type contemplated for attachment by the apparatus of the instant invention comprise spaced fitments joined by a flexible strap, and a machine in accord with the invention includes a handle feeding arrangement for conveying a train of handles along a first path toward a work station, additionally including a fitment mounting unit that is aligned with the work station and that includes stationary structure overlying the work station. A head is mounted on the stationary structure for reciprocable movements toward and away from the work station, and laterally spaced fitment assembly members are arranged with the reciprocal head to be cyclically operable in a second path terminating at the work station.

The invention, both to its construction and its mode of operation, will be better understood by reference to the following disclosure and drawings forming a part thereof, wherein:

FIG. 1 is a fragmentary, perspective view of a gabled carton to which there has been assembled a handle of the type contemplated by the present invention;

FIG. 2 is an enlarged, fragmentary, side elevational view taken in cross-section through the assembly of FIG. 1 to show the cooperation between the handle fitment and the peak of one gabled end of the carton;

FIG. 3 is an end elevational view of the showing of FIG. 2;

FIG. 4 is a perspective view taken on an intermediate scale and illustrating the handle of FIG. 1;

FIG. 5 is a diagrammatic, perspective view of the terminal portion of a carton assembly and filling line at which there has been installed a handle assembling apparatus in accord with the present invention;

FIG. 6 is an enlarged, side elevational view of the handle assembling apparatus of FIG. 5, showing a gabled carton in position for receiving a handle and illustrating the fitment mounting means in ready condition;

FIG. 7 is a further enlarged, side elevational view taken in cross-section to illustrate the construction of the fitment assembly members and associated structure;

FIG. 8 is a front elevational view taken substantially along the line 8—8 of FIG. 6;

FIG. 9 is a top plan view taken substantially along the line 9—9 of FIG. 6;

FIG. 10 is a view similar to the showing of FIG. 8 but illustrating the fitment assembly members in the first stages of placing the handle device on a gabled carton;

FIG. 11 is a view similar to the showing of FIG. 10 but illustrating the assembly members in their position completing the mounting of a handle to the carton; and FIG. 12 is an enlarged perspective view of the carton aligning means and handle feeding means used in the apparatus of FIGS. 5–11.

Referring now in detail to the drawings, specifically to FIGS. 1–3, a handle 20 is shown assembled with a gabled carton 22 to form a package unit. The carton 22 is of well-known gabled construction, being fabricated from boxboard stock that is suitably coated with paraffin, polyethylene or like material to make it waterproof. The top end of carton 22 has flat sloping walls 24 and 26 which subtend oppositely opening, triangular recesses 28. The recesses have upwardly and inwardly sloping floors 30, and the walls 24 and 26 define oppositely disposed, dihedral edges 32 and 34. Some forms of gabled cartons include an apical ridge such as is indicated at 36.

The carrier handle 20 is of the type generally described in the aforesaid application Ser. No. 429,535 and comprises spaced fitments 40 that are joined by a flexible carrying strap 42. The fitments 40 are mirror images of each other and are arranged for gripping engagement with the opposite peaks of a gabled carton 22. Considering FIG. 4, each fitment 40 includes correspondingly angled upper and lower plates 44 and 46 which are joined by an outboard plate 48. Webs 50 join strap 42 to the upper plates 44, and each end of the strap 42 shares a confluent slot 52 with the corresponding upper plate 44 in order to pass one end of the apical ridge 36, as is best shown in FIG. 3.

The handle 20 is advantageously fabricated from such tough, flexible, resinous materials as the polyolefins and certain modified styrene polymers, for example; and a number of the carrier handles 20 are desirably interconnected by easily broken legs 53 that extend from the opposite ends of the lower, angled plate 46, as is shown in FIG. 4. Interconnection of a plurality of the carrier handles 20 in such a train facilitates their being fed into the assembling apparatus of the instant invention.

Turning to a consideration of FIG. 5, the carrier handles 20 are intended to be affixed individually to the gabled cartons 22 by assembly apparatus 54; and the handle assembly apparatus 54 is arranged with carton filling and sealing equipment which includes an exit conveyor 56 that is either continuously or intermittently driven. Furthermore, the handle assembly apparatus 54 is specifically adapted for easy installation with the carton filling and sealing equipment. Specifically, the assembly apparatus 54 is constructed to be cantilevered over the exit conveyor 56 at an accessible portion thereof to define a work station indicated generally by the reference numeral 58. The illustrated conveyor 56 comprises a series of articulated platform elements 60 which are affixed to the links of a pair of parallel drive chains 62 and 64. The platform elements 60 are driven in the general direction of arrow 66 by means of suitably powered sprockets 68 which are interconnected by means of a common shaft 70 and which mesh with the chains 62 and 64. It is recognized that other types of conveyors may be used.

In order to coordinate the operation of conveyor 56 with the operation of assembly apparatus 54, a horizontally swingable carton stop 72 is arranged to overlie the top surface of the conveyor at the work station 58; and in order to admit the cartons 22 to the work station 58 individually, a vertically swingable carton gate 74 is positioned generally upstream of the work station. The stop 72 and the gate 74 are driven in timed sequence by power transmitting means, not shown. In addition, position responsive switches are appropriately situated and conveniently employed to operate electric, pneumatic or hydraulic circuitry which, in turn, provides the properly timed, operating impulses to assembly apparatus 54, carton stop 72 and carton gate 74. More specifically, a position responsive switch 76 is mounted overlying conveyor 56 at work station 58 by means of a bracket 78, switch 76 including an actuator member 80 that is located to sense the presence of a carton 22 in proper position for assembly of a handle 20 thereto. The assembly apparatus 54 includes a stationary structure 82 and a vertically reciprocable head 84 as will be described more fully hereinafter. At this juncture, it is only necessary to state that a position responsive switch 86 is mounted to the stationary structure 82 by means of a bracket 88, switch 86 including an actuator member 90 that is disposed to sense the presence of head 84 in its upwardly directed position relative to the conveyor 56. In addition to the stationary structure 82 and the vertically reciprocable head 84, the assembly apparatus 54 broadly includes a feeding unit 92 for conveying a train of the handles 20 along a path toward the work station 58.

Turning to a consideration of FIGS. 6 and 8 for a more detailed description of the assembly apparatus 54, vertical head 84 comprises a workplate 94 which is suitably fastened to the lower ends of a pair of guide posts 96; and these posts are directed in parallel paths by contact with linear travel ball bearings 98, ball bearings 98 being mounted in a support plate 100 which is a part of the stationary structure 82. The support plate 100 is affixed to a pair of arched arms 102 which cantilever the plate 100 over the conveyor 56. The arms 102 are, in turn, secured to a platform 104 which acts as a storage or supply member for a plurality of the handles 20, platform 104 cooperating with a handle advancing mechanism 106 in defining the feeding unit 92.

Whereas the guide posts 96 coact with the bearings 98 to direct vertical travel of the head 84, powered movement of the head is achieved by means of a fluid-actuated jack 108 which is of either the hydraulic or the pneumatic type. Jack 108 specifically comprises a piston 110 which is slidably disposed in a hollow cylinder 112 that has been bored in the support plate 100. In order that the piston 110 may be driven in both directions of its stroke, fluid is led into and out of the space above the piston by means of a conduit 114 which makes connection through a passageway 116 that has been formed in an upper cylinder cap 118, as is best shown in FIG. 8. Cooperatively, fluid is led into and out of the space beneath piston 110 by means of a conduit 120 which makes connection through a passageway 122 that has been fashioned in a lower cylinder cap 124. In accordance with conventional procedures, the piston 110 and the cylinder caps 118 and 124 are provided with suitable gaskets and gasket-receiving grooves. In addition, the cylinder caps 118 and 124 are secured in place with machine screws or other suitable fastening means.

The piston 110 is mounted on the upper end of a vertical rod 126; and with reference to FIG. 7, downward force is transmitted from the rod 126 to the workplate 94 of reciprocable head 84 by means of a washer 128. Washer 128 engages the upper end of a compression spring 130 whereas the lower end of spring 130 abuts a shoulder 132 that forms the floor of an upwardly tapering bore 134 formed in the workplate 94. The rod 126 is also slidably disposed in a bore 136 which is formed coaxial with the bore 134; and in order to transmit force to the workplate 94 for moving the same in an upwardly direction, a cross-pin 138 is mounted in the lower end of the rod 126. Cooperatively, the front wall of workplate 94 is perforated with a vertically elongated slot 140 that slidably receives the exposed end of cross-pin 138. The upper end of slot 140 establishes a stop which is engaged by the cross-pin 138 in its upward travel whereby to apply raising force to the workplate 94.

Returning to a consideration of FIGS. 6 and 8, the guide posts 96 carry adjustably positionable stops 142 which abut the upper surface of support plate 100 in arresting downward travel of the workplate 94. The reciprocable head 84 and its immediately associated mechanisms define means for mounting the fitments 40 of a carrier handle 20 to the peaks of a gabled carton 22; and a pair of fitment assembly members 144 are rotatably mounted on the workplate 94 to be operated at the lower end of the travel of the reciprocable head 84. As is indicated in FIGS. 6 and 8, the fitment assembly members 144 are situated in vertical alignment generally overlying the fitments of a carrier handle 20 at work station 58. Rotary mounting blocks 146 comprising a circular plate 148 and a central shaft 150 are included for this purpose. The plates 148 are exposed from the front face of workplate 94, and the shafts 150 are rotatably mounted in the workplate 94 using bearings 152 best seen in FIG. 6. The fitment assembly members 144 are secured on the shafts 150 to be exposed from the back face of the workplate 94.

Force for rotating the assembly members 144 is transmitted from the piston rod 126 to the mounting blocks 146 by means of a pair of links 154, best seen in FIG. 8. Each link 154 is pivotally mounted at a medial position to the workplate 94 by means of a pin 156. Cooperatively, the adjacent inner ends of the links 154 are provided with axially extending slots 158; and these slots receive the free end of cross-pin 138, as is best shown in FIG. 7. A washer and cotter pin arrangement or similar structure is usefully employed in holding the links 154 in position on the cross-pin 138. Returning to FIG. 8, the remote ends of links 154 are provided with axial slots 160 which slidably receive eccentric pins 162 that extend forwardly from the mounting blocks 146.

In accordance with the features of the present invention, each of the fitment assembly members 144 is fashioned as a spool-like element having, as is best shown in FIG. 7, confronting faces 164 and 166. These faces are defined by disc-like elements that are spaced apart by an intervening cylindrical element 168 of lesser diameter. The cylindrical element 168 is arranged to space the faces 164 and 166 by a distance corresponding to the width of a fitment of the carrier handle 20 in order that these spaces in the members 144 may act as guides for directing the fitments into assembled condition with the peaks of a gabled carton. In further accord with the features of the invention, each of the fitment assembly members 144 includes a radial arm 170 that extends from the cylindrical element 168 to serve as a fitment positioning element upon rotation of the assembly member 144. The specific action of the radial arms 170 will be described more fully hereinafter. Continuing with reference to FIG. 7, a knife 172 is mounted to the reciprocable head 84 in juxtaposition with each of assembly members 144 by means of a bracket 173. The knives 172 serve to sever the legs 53, cutting against a suitable block, not shown, whereby to free the forwardmost carrier handle 20 from attachment with the remainder of the interconnected handles.

Continuing now with reference to FIGS. 6, 7 and 9 for a more detailed description of the handle feeding unit 92, it has been stated hereinabove that the unit 92 broadly comprises both a platform 104 that holds a supply of the handles 20 and an advancing mechanism 106 for delivering individual handles to the work station 58. Referring in greater particularity first to FIG. 6, the platform 104 is seen supported on spaced legs 174, platform 104 defining a horizontal surface or table and being provided at its forward end with a cutout or open region 176 the purpose of which will appear shortly. The handle advancing mechanism 106 includes a horizontally reciprocable work block 178 that is shaped to operate in the cutout region 176 and that is connected to the forward end of a shaft 180. Shaft 180 is slidably mounted in a housing 182 by means of linear travel ball bearings 184, and the housing 182 is fastened to the underside of platform 104 by means of a bracket 186. A compression spring 188 is confined between bracket 186 and a head element 190 which is affixed to the rear end of shaft 180, spring 188 thus biasing the work block 178 in a generally rearward direction. Forward movement of the work block 178 is achieved by means of a fluid actuated jack 192 which is mounted to the platform 104 by means of a bracket 194. The jack 192 includes an extensible and retractable rod 196 that carries an abutment block 198 on its forward end, block 198 being adapted to engage the head element 190 for driving the workplate 178 generally toward the work station 58.

For advancing one of the handles 20 from the platform 104 to the work station 58, the work block 178 carries laterally spaced pawls 200 best shown in FIG. 7. Each of the pawls 200 includes a generally horizontal upper finger 202 and a parallel lower finger 204. The fingers 202 and 204 are vertically spaced to admit the strap 42 of a handle 20 therebetween. In addition, each of the pawls 200 includes an inclined surface 206 which slopes gradually upwardly from the top surface of work block 178 to the upper finger 202, surface 206 being thereby capable of leading the upper finger 202 beneath the strap of a handle 20 upon rearward or retractive movement of the work block 178. A backup plate 208 is affixed to the work block 178 underlying the pawls 200 to aid in positioning the apical ridge 36 of a gabled carton 22.

In compliance with a feature of the invention, each of the gabled cartons 22 is aligned in proper position at the work station 58, and the backup plate 208 comprises one component of the carton aligning means. Continuing with reference to FIG. 7 and with supplemental reference to FIG. 12, a horizontal positioning plate 210 is mounted on a pair of vertical, deflected arms 212 to oppose the backup plate 208. The arms 212 are swingably mounted to the stationary structure 82 by means of mounting blocks 214 and pivot pins 216; and in order to bias the plate 210 toward the plate 208 in a yieldable manner, a tension spring 218 is connected between a transverse rod 220, which is itself secured between the arched arms 102, and a transverse bar 222 which is fastened to the deflected vertical arms 212.

The vertical, deflected arms 212 also aid in aligning a handle 20 laterally for facilitating its attachment to a gabled carton; and in compliance with still another feature of the invention, holding means are provided for locating and restraining movement of a handle strap 42 when the same is disposed at the work station 58. Specifically, a stop bar 224 is suitably attached to the arms 212 spanning a position overlying the path of the pawl fingers 202. Advantageously, the stop bar 224 is selected to have a length which permits it to reside between the upper pawl fingers 202. So positioned, the stop bar 224 serves to restrain the strap 42 against upward reflection upon downward movement of the fitments 40. In addition, the stop bar 224 cooperates with the arms 212 and the advancing pawls 200 in aligning and straightening, if necessary, the strap of a handle 20 delivered to the work station 58.

For purposes of affording a more complete understanding of the invention, it is advantageous now to provide a functional description of the mode in which the component parts cooperate.

Assuming that the exit conveyor 56 of the carton filling and sealing equipment is operating and assuming that fluid under suitable pressure is available for actuating the jacks 108 and 192, the return of head 84 from a previous assembly operation will engage the actuator member 90 of position responsive switch 86 so as to cause operation of the carton stop 72 releasing the previously completed package unit and so as to cause operation of the carton gate 74 admitting a handleless carton 22 into the work station 58. When this latter carton arrives in the work station at the halted position which is established by the returned stop 72, the actuator member 80 of position responsive switch 76 will be engaged by the carton to actuate the handle feeding unit 92 and the reciprocable head 84 in properly timed sequence.

Jack 192, having retracted the piston rod 196 upon completion of the previous assembly operation, will have pulled work block 178 toward the back of region 176, correspondingly withdrawing the pawl fingers 202 behind the strap 42 of the now forwardmost handle 20 in the train of handles disposed on platform 104. Initiation of the cycle by switch 76 energizes jack 192 to advance abutment block 198 against the shaft 180 so as to drive the block 178 forwardly toward the work station 58 and against the bias of spring 188. As the pawl fingers 202 and 204 advance, the strap 42 of the forwardmost handle 20 will be seated therebetween, and the entire train of interconnected handles will be advanced one step, the forwardmost handle being positioned in the work station 58 ready for assembly to the carton 22 therebeneath.

As the work block 178 is thus advanced, the backup block 208 will engage the apical ridge 36 of the carton urging the ridge against the resiliently mounted positioning plate 210 whereby to align the ridge, the gabled ends of the carton and, in fact, the entire carton. With a handle 20 and a carton 22 thus properly positioned at work station 58, the jack 108 will be actuated to urge the reciprocable head 84 downwardly for assembling the handle fitments 40 to the gabled ends of the carton 22. The ready condition of head 84 is illustrated in FIG. 8; and as the jack 108 is actuated to drive the head downwardly, it will gradually assume the position shown in FIG. 10. In this latter condition, the stops 142 on guide posts 96 will have engaged the upper surface of the stationary support plate 100 so as to prevent further downward movement of the workplate 94. At this time, the fitments 40 of the handle 20 will have been seated between the guide surfaces 164 and 166 of the assembly members 144, the fitments 40 being depressed slightly by their engagement with the intervening cylindrical element 168 in compliance with the showing of FIG. 10.

Further movement of the piston rod 126 urges the washer 128 downwardly tending to compress the spring 130 while urging the cross-pin 138 to the lower end of slot 140. This movement of the cross-pin 138 is translated into rotary motion of the assembly members 144 by means of the links 154, the assembly members 144 rotating generally in the direction of the arrows 226 of FIG. 11. This rotary motion of the fitment assembly members 144 causes the radial arms 170 to converge so as to drive the fitments 40 tightly into assembled condition with the gabled ends of the carton 22 as is shown in FIG. 11. It is important to note that the fitments are guidably pushed into engagement with the carton, a wiping action relying on frictional contact only with the fitments having proved unsatisfactory. During this assembly of the fitments 40, the center of the handle strap 42 is restrained against upward bowing by the stop bar 224 in accordance with the descriptions given hereinabove with reference to FIGS. 7 and 12.

Upon completion of the assembly operation, the jack 108 is reversed to urge piston rod 126 in a generally upward direction. The first result is the release of compressive force stored in the spring 130, the workplate 94 remaining in position while the assembly members 144 are rotated in the direction opposite to the arrows 226 as the cross-pin 138 is raised. Thereafter, the reciprocable head 84 is lifted; and the jack 192 is actuated to retract the work block 178 from its position at work station 58, withdrawing the pawls 200 to permit exit of the finished package unit and completing a work cycle.

While a particular embodiment of the invention has been shown and described, it should be understood that the invention is not strictly limited thereto since many modifications may be made. It is therefore contemplated to cover by the present application both the illustrated embodiment and any such modifications as fall within the true spirit and scope of the appended claims.

The invention is claimed as follows:

1. Apparatus for assembling handles to cartons, said handles being of a type having spaced fitments joined by a flexible strap, said apparatus comprising: handle feeding means for conveying a train of said handles along a first path toward a work station, including supply means for storing a plurality of said handles and reciprocal pawl means for advancing one of said handles to said work station; fitment mounting means aligned with said pawl means at said work station and including laterally spaced fitment assembly members cyclically operable in a second path terminating at said work station; and strap holding means at said work station for locating and restraining movement of a handle strap during operative movement of said fitment assembly members, including stop bar means disposed overlying the path of said pawl means.

2. Apparatus for assembling handles to cartons, said handles being of a type having spaced fitments joined by a flexible strap, said apparatus comprising: handle feeding means, including pawl means for conveying a said handle along a path toward a work station; and fitment mounting means aligned with said work station and including fitment guide means having spaced opposed walls aligned with said pawl means at said work station for directing movement of the fitments of a said handle toward an assembled position with a said carton, said mounting means further including positioning means operable to contact a handle disposed at said work station by said pawl means and cause forcibly guided movement of the fitments thereof between said walls.

3. Apparatus for assembling handles to cartons, said handles being of a type having spaced fitments joined by a flexible strap, said apparatus comprising: handle feeding means for conveying a train of said handles along a path toward a work station, including supply means for storing a plurality of said handles and reciprocal pawl means for advancing one of said handles to said work station, said pawl means including laterally spaced pawl fingers adapted to receive a portion of a handle strap; fitment mounting means aligned with said work station and including fitment guide means having spaced opposed walls for directing movement of the fitments of a said handle toward an assembled position with a said carton, said mounting means further including positioning means operable to contact a handle disposed at said work station and cause forcibly guided movement of the fitments thereof; and strap holding means at said work station for locating and restraining movement of a handle strap, including a stop bar disposed overlying the path of said pawl fingers and spanning the space therebetween.

4. Apparatus for assembling handles to cartons, said handles being of a type having spaced fitments joined by a flexible strap, said apparatus comprising: handle feeding means for conveying a train of said handles along a path toward a work station, including supply means for storing a plurality of said handles and reciprocal pawl means for advancing one of said handles to said work station; fitment mounting means aligned with said work station and including fitment guide means having spaced opposed walls aligned with said pawl means at said work station for directing movement of the fitments of a said handle toward an assembled position with a said carton, said mounting means further including positioning means operable to contact a handle disposed at said work station by said pawl means and cause forcibly guided movements of the fitments thereof between said walls; and carton aligning means at said work station, including a backup block mounted for advance in unison with said pawl means, an opposed positioning plate and means yieldably biasing said plate toward said block for positioning the apical ridge of a said carton for reception of a said handle.

5. Apparatus for assembling handles to cartons, said handles being of a type having spaced fitments joined by a flexible strap, said apparatus comprising: handle feeding means for conveying a train of said handles along a path toward a work station, including supply means for storing a plurality of said handle and reciprocal pawl means for advancing one of said handles to said work station, said pawl means including laterally spaced fingers adapted to receive a portion of a handle strap; fitment mounting means aligned with said work station and including fitment guide means having spaced opposed walls for directing movement of the fitments of a said handle toward an assembled position with a said carton, said mounting means further including positioning means operable to contact a handle disposed at said work station and cause forcibly guided movement of the fitments thereof; strap holding means at said work station for locating and restraining movement of a handle strap, including a stop bar disposed overlying the path of said pawl fingers and spanning the space therebetween; and carton aligning means at said work station, including a backup block mounted for advance in unison with said pawl means, an opposed positioning plate and means yieldably biasing said plate toward said block.

6. Apparatus for assembling handles to cartons, said handles being of a type having spaced fitments joined by a flexible strap, said apparatus comprising: handle feeding means for conveying a train of said handles along a path toward a work station, including supply means for storing a plurality of said handles and reciprocal pawl means for advancing one of said handles to said work station, said pawl means including laterally spaced fingers adapted to receive a portion of a handle strap; strap holding means at said work station for locating and restraining movement of a handle strap, including a stop bar disposed overlying the path of said pawl fingers and spanning the space therebetween; and fitment mounting means, including stationary structure overlying said work station, a head mounted to said structure for reciprocal movements toward and away from said work station, laterally spaced fitment assembly members having fitment guide means and swingable fitment positioning elements, drive means for said head, means rotatably mounting said members on said head, stop means for terminating travel of said head toward said work station, and force transmitting means interconnecting said drive means and said assembly members for rotating said members at the end of the travel of said head so constructed and arranged as to converge said fitment positioning elements whereby to urge the fitments of a said handle into assembled condition with a carton.

7. Apparatus for assembling handles to cartons, said handles being of a type having spaced fitments joined by a flexible strap, said apparatus comprising: handle feeding means for conveying a train of said handles along a path toward a work station, including supply means for storing a plurality of said handles and reciprocal pawl means for advancing one of said handles to said work station; fitment mounting means, including stationary structure overlying said work station, a head mounted to said structure for reciprocal movements toward and away from said work station, laterally spaced fitment assembly members having fitment guide means and swingable fitment positioning elements, drive means for said head, means rotatably mounting said members on said head, stop means for terminating travel of said head toward said work station, and force transmitting means interconnecting said drive means and said assembly members for rotating said members at the end of the travel of said head so constructed and arranged as to converge said fitment positioning elements whereby to urge the fitments of a said handle into assembled condition with a carton; carton feeding means for delivering a sequence of cartons to said work station underlying said head; and carton aligning means at said work station, including a backup block mounted for advance in unison with said pawl means, an opposed positioning plate and means yieldably biasing said plate toward said block.

8. Apparatus for assembling handles to cartons, said handles being of a type having spaced fitments joined by a flexible strap, said apparatus comprising: handle feeding means for conveying a train of said handles along a path toward a work station, including supply means for storing a plurality of said handles and reciprocal pawl means for advancing one of said handles to said work station, said pawl means including laterally spaced fingers adapted to receive a portion of a handle strap; strap holding means at said work station for locating and restraining movement of a handle strap, including a stop bar disposed overlying the path of said pawl fingers and spanning the space therebetween; fitment mounting means, including stationary structure overlying said work station, a head mounted to said structure for reciprocal movements toward and away from said work station, laterally spaced fitment assembly members having fitment guide means and swingable fitment positioning elements, drive means for said head, means rotatably mounting said members on said head, stop means for terminating travel of said head toward said work station, and force transmitting means interconnecting said drive means and said assembly members for rotating said members at the end of the travel of said head so constructed and arranged as to converge said fitment positioning elements whereby to urge the fitments of said handle into assembled condition with a carton; carton feeding means for delivering a sequence of cartons to said work station underlying said head; and carton aligning means at said work station.

9. Apparatus for assembling handles to cartons, said handles being of a type having spaced fitments joined by a flexible strap, said apparatus comprising: handle feeding means for conveying a train of said handles along a path toward a work station, including supply means for storing a plurality of said handles and reciprocal pawl means for advancing one of said handles to said work station, said pawl means including laterally spaced fingers adapted to receive a portion of a handle strap; strap holding means at said work station for locating and restraining movement of a handle strap, including a stop bar disposed overlying the path of said pawl fingers and spanning the space therebetween; fitment mounting means, including stationary structure overlying said work station, a head mounted to said structure for reciprocal movements toward and away from said work station, laterally spaced fitment assembly members having fitment guide means and swingable fitment positioning elements, drive means for said head, means rotatably mounting said members on said head, stop means for terminating travel of said head toward said work station, and force transmitting means interconnecting said drive means and said assembly members for rotating said members at the end of the travel of said head so constructed and arranged as to converge said fitment positioning elements whereby to urge the fitments of a said handle into assembled condition with a carton; carton feeding means for delivering a sequence of cartons to said work station underlying said head; and carton aligning means at said work station, including a backup block mounted for advance in unison with said pawl means, an opposed positioning plate and means yieldably biasing said plate toward said block.

References Cited

UNITED STATES PATENTS 3,047,031  7/1962  Came et al. _____ 29—208 X
3,195,228  7/1965  Beacham _____ 29—208

THOMAS H. EAGER, *Primary Examiner.*